Figure 3:
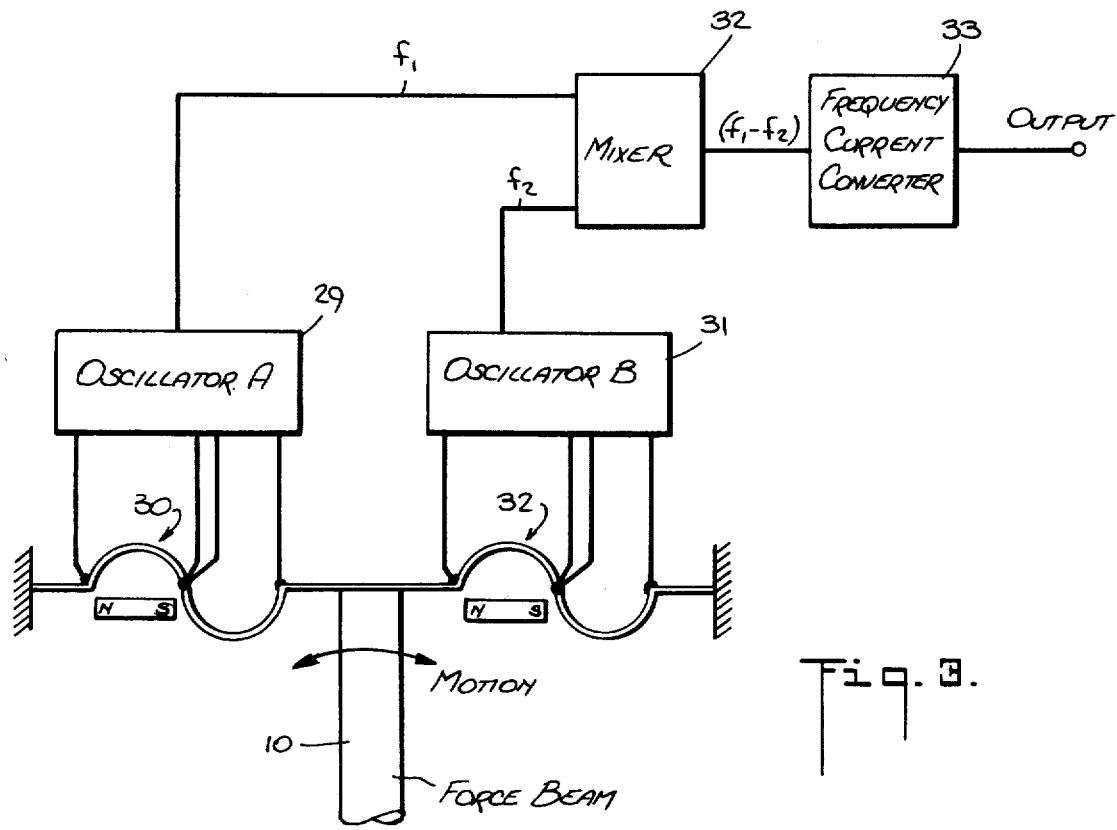

United States Patent [19]

Kazahaya

[11] 3,968,693
[45] July 13, 1976

[54] OPEN-LOOP DIFFERENTIAL-PRESSURE TRANSMITTER

[75] Inventor: Masahiro Kazahaya, Southampton, Pa.

[73] Assignee: Fischer & Porter Co., Warminster, Pa.N

[22] Filed: May 21, 1975

[21] Appl. No.: 579,712

[52] U.S. Cl. .............................. 73/398 R; 73/407 R; 73/DIG. 2
[51] Int. Cl.² ........................................... G01L 9/16
[58] Field of Search ......... 73/398 R, 407 R, DIG. 2, 73/388 BR

[56] References Cited
UNITED STATES PATENTS

| 3,168,830 | 2/1965 | Chass | 73/DIG. |
| 3,274,833 | 9/1966 | Ollivier et al. | 73/398 R |
| 3,342,072 | 9/1967 | Trekell | 73/398 R |
| 3,343,420 | 9/1967 | Kondo et a. | 73/407 |
| 3,459,045 | 8/1969 | Sanford | 73/398 R |
| 3,564,923 | 2/1971 | Nudd et al. | 73/398 R |

Primary Examiner—Donald O. Woodiel

[57] ABSTRACT

An electronic differential-pressure transmitter responsive to a difference between two pressure values to generate an output signal proportional to differential pressure for transmission to a remote station for acuating indicator or process control equipment. The transmitter is of the open-loop type that includes a pivoted force-beam to the lower end of which is applied an input force dependent on differential pressure, the resultant deflection of the beam being sensed by a motion detector coupled to the upper end thereof to produce the output signal.

16 Claims, 8 Drawing Figures

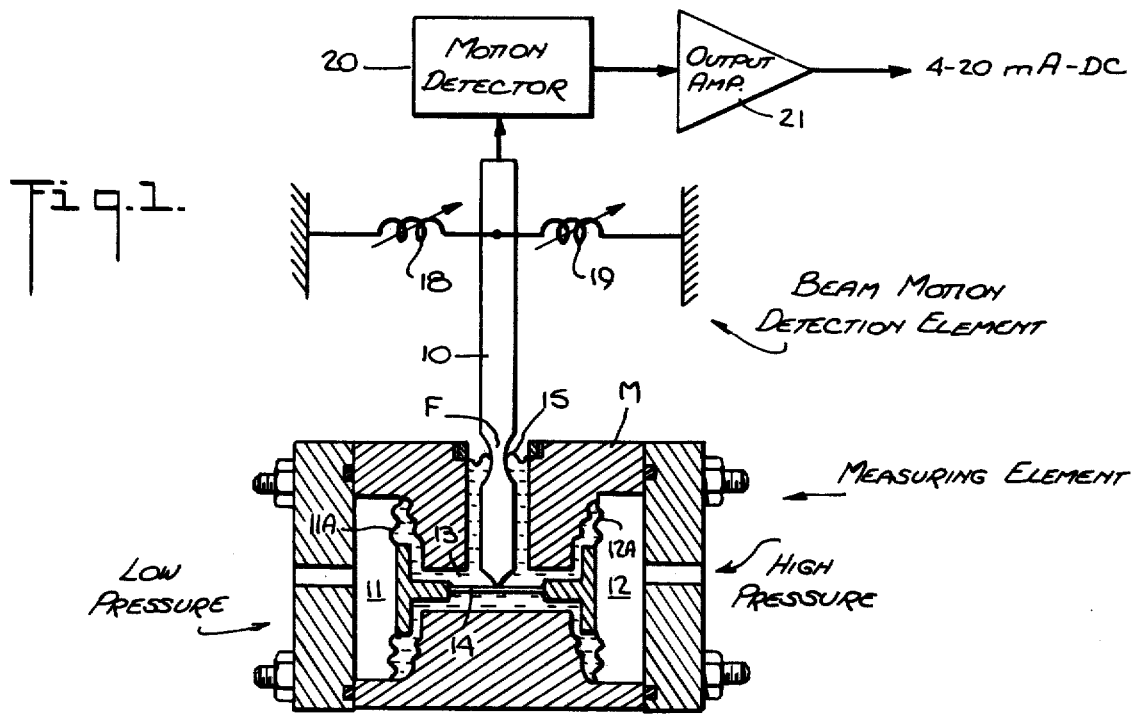
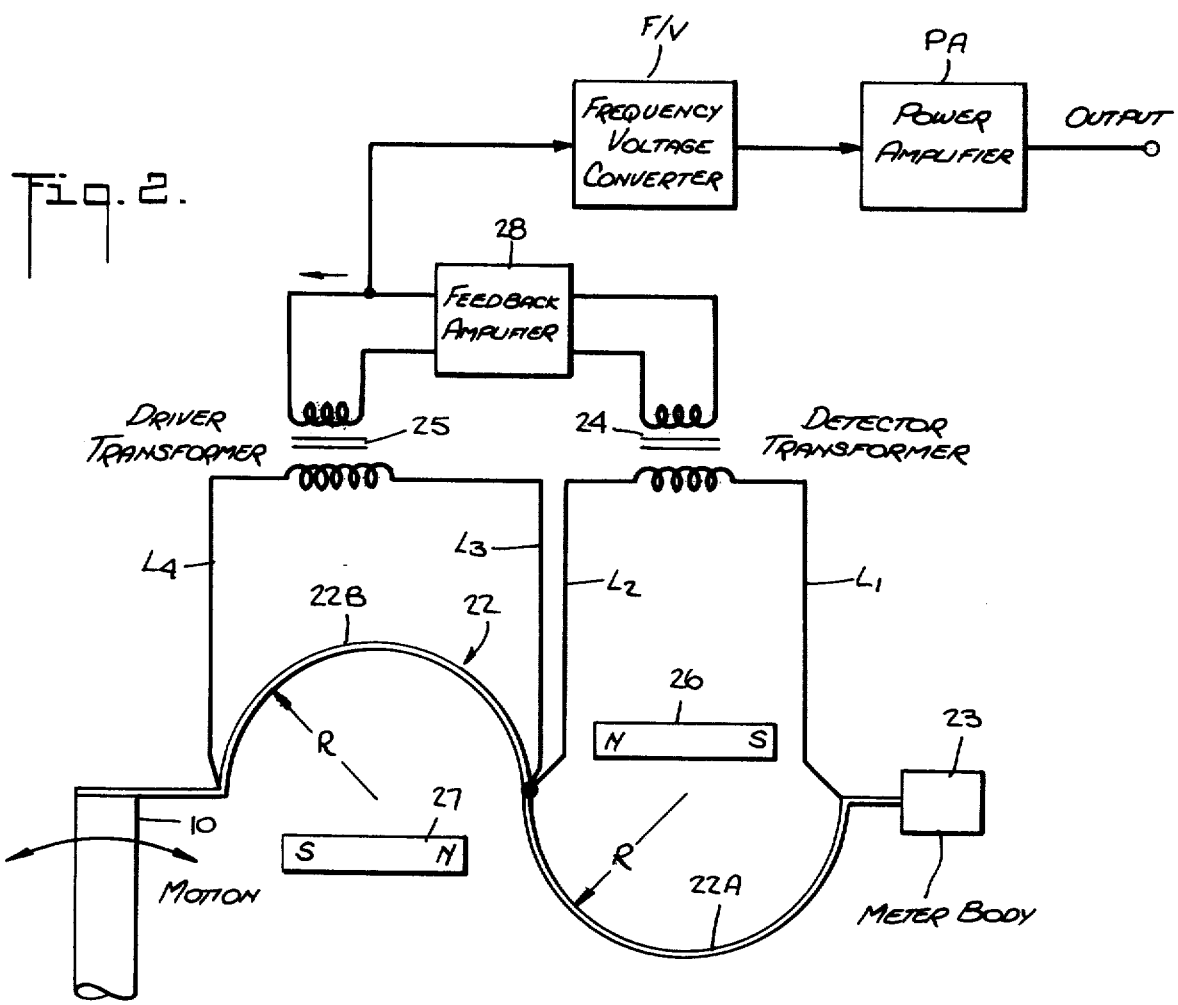

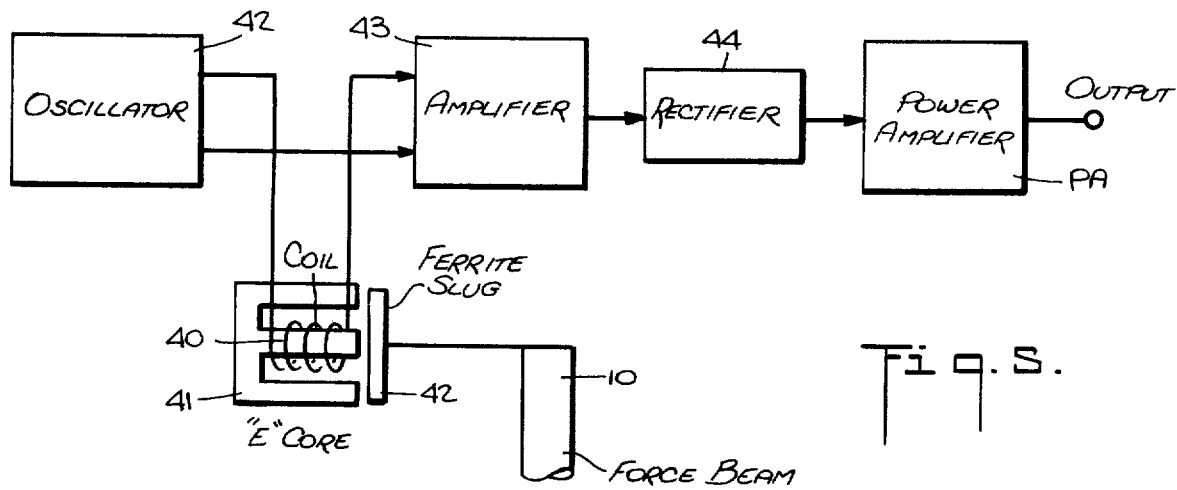
Fig. 5.
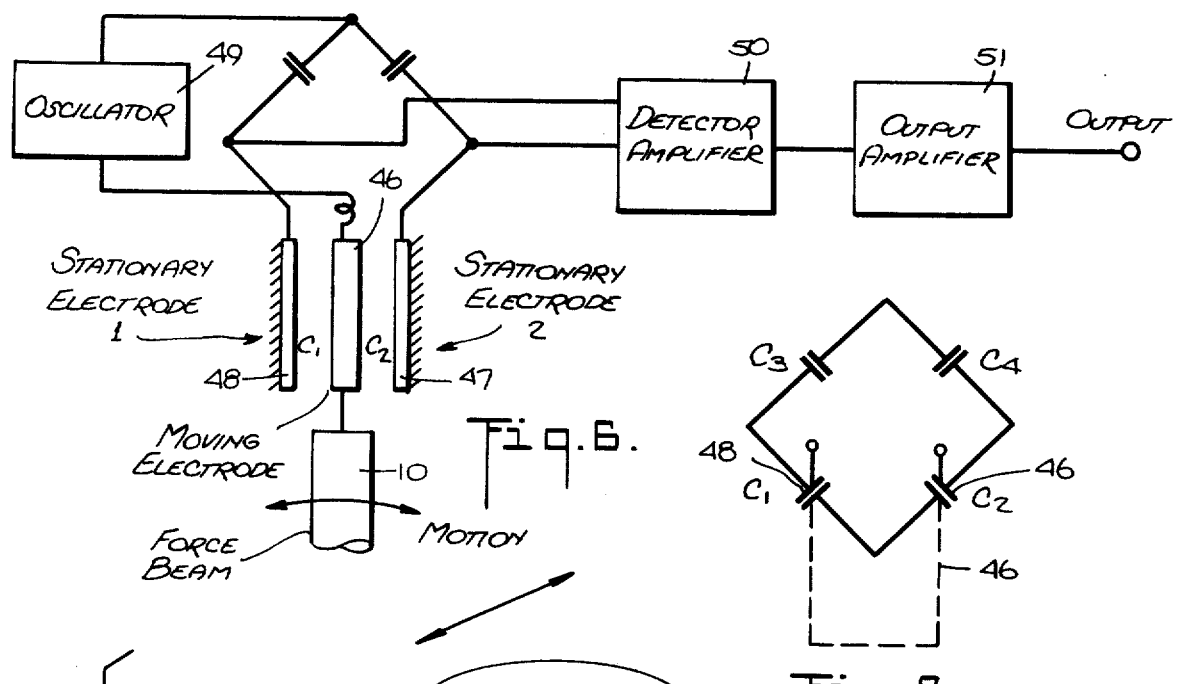
Fig. 6.
Fig. 7.
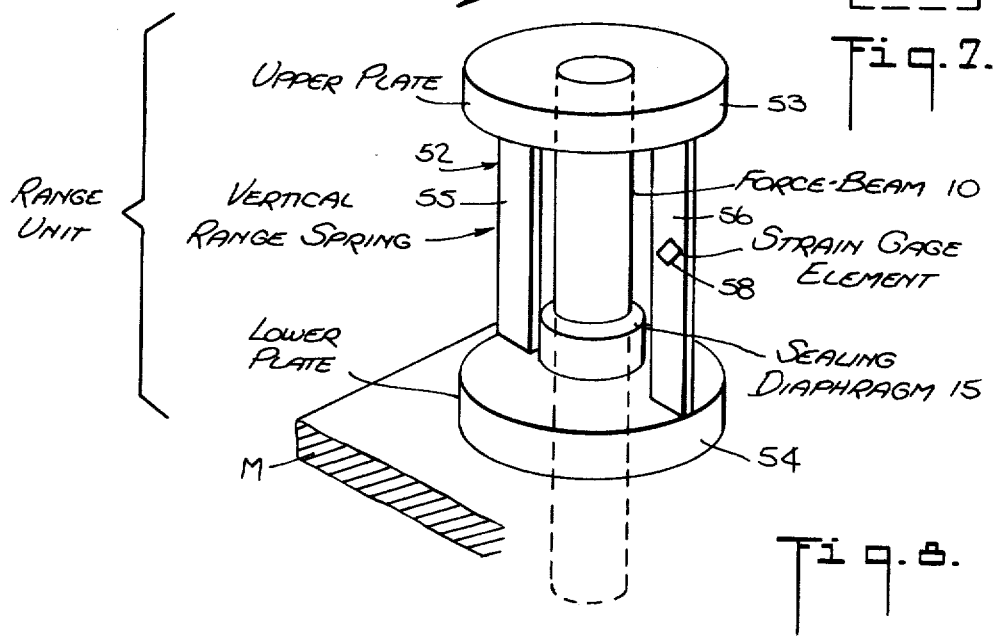
Fig. 8.

OPEN-LOOP DIFFERENTIAL-PRESSURE TRANSMITTER

BACKGROUND OF INVENTION

This invention relates generally to electronic differential pressure transmitters, and more particularly to a transmitter of the force-beam type which operates on an open loop principal.

A differential pressure transmitter is used to measure various process variables such as flow rate, liquid level and density when these process variables are convertible to a differential pressure signal. One important application of the force-balance principle is in a differential-pressure transmitter. Such transmitters are widely used in industrial process systems to produce an output signal suitable for transmission to a remote station for operating indicator and/or process control equipment.

In a transmitter of this type, an elongated force bar is pivoted about a transverse axis and an input force derived from a differential pressure capsule and corresponding to the flow rate of the fluid to be measured is applied to the force bar to produce a torque about its fulcrum. Also applied is a rebalance torque which tends to hold the bar motionless.

The rebalance torque is developed by a negative feedback loop that includes a detector to sense any slight change in force bar position due to an unbalance of torques. The detector generates a corresponding feedback signal that is directed to a feedback motor. The motor, in turn, applies to the force bar a force in opposition to the input force. This feedback signal is maintained proportional to the differential pressure being measured and is usable to produce an output signal for transmission to a remote control station or to an indicating or recording device.

In a force-balance instrument of the electrical type, such as that disclosed in U.S. Pat. No. 3,832,618, the feedback system is provided with an electric motor and the output signal is electrical in nature, whereas in the pneumatic type, such as that disclosed in U.S. Pat. No. 3,742,969, the motor is in the form of a pneumatically-actuated bellows and the output signal which is applied to the bellows is fluidic in nature.

In a force-balance transmitter, there is virtually no movement of the force bar over the full-scale range of operation. This virtual absence of movement is highly advantageous, for it effectively eliminates non-linearity and other errors of the type encountered in so-called motion-balance instruments.

In a force-balance instrument, it is important to be able to change the operating range or span of the instrument. In an instrument of the type disclosed in U.S. Pat. No. 3,564,923, in which the feedback system is electrical in nature and employs a feedback motor, the force-balance mechanism includes a vernier range-changing structure in the form of a flexured reaction member and a rotatable support element adapted to change range without altering the static balance of the instrument.

A differential-pressure force-balance transmitter of the type heretofore known acts on a closed-loop principle in that the input force applied to the force bar is balanced by a feedback force applied thereto through a feedback loop.

Also known are electronic differential pressure transmitters of the so-called open-loop type. In one form of an open-loop differential transmitter, the low and high pressure fluid inputs are applied to a pair of process diaphragms which are hydraulically coupled to opposite sides of an electrode diaphragm. The deflection of the electrode diaphragm depends, therefore, on the difference between the low and high input pressures. This deflection is converted into a corresponding change in the capacitance established between the electrode diaphragm and the meter body. The change in capacitance is detected by a capacitance bridge and amplified to generate an output signal which represents differential pressure.

The advantage of an open-loop differential pressure transmitter of the above-described transducer type over a standard, closed-loop transmitter of the force-balance type is that the former is not only relatively light-weight and less expensive to manufacture, but it is also substantially insensitive to mechanical vibration. On the other hand, the force-balance type is characterized by high accuracy, a wide zero suppression range and the absence of electrical connections in the meter body, an important safety factor.

SUMMARY OF INVENTION

In view of the forgoing, it is the main object of this invention to provide a differential-pressure transmitter of the force-beam type operating on the open-loop principle to provide an electrical signal that is a function of a process variable such as flow rate liquid level or density.

A significant aspect of the invention resides in the fact that it possesses the advantages both of a force-balance closed-loop meter and of an open-loop transducer including linear characteristics without the drawbacks characteristic of such devices. Moreover, since a transmitter in accordance with the invention does not include a pneumatic of electric-feedback motor, meter bodies of the type currently used either in a pneumatic or an electric differential-pressure transmitter may be used for the open-loop force-beam instrument.

Among the features of the present invention are the following:

A The open-loop differential-pressure transmitter of the force-beam type is lighter in weight and smaller in size than those of the closed-loop type. The invention does away with the need for the relatively massive force motor and break-away mechanism included in standard closed-loop instruments.

B The open-loop force-beam transmitter is characterized by wide zero suppression. With a conventional open-loop transducer of the capacitative type, the zero suppression range is limited by the space between the electrode diaphragm and the blocks of the meter body. For wide zero suppression, this space must be made wide, but in doing so one reduces the capacitance of the transducer and therefore its sensitivity. But with an open-loop force-beam transmitter, the zero bias spring is external to the meter body; hence one is able to achieve a zero suppression range equivalent to that of a force-balance transmitter of the closed loop type.

C With an open-loop force-beam transmitter, all electrical connections are in a motion detector external to the meter body; hence there is no electrical connection in the meter body as in an open-loop capacitative transducer. When the meter body is exposed to fluids at high temperatures, as is often the case, any electrical component contained in the body is similarly exposed and this may be damaging to the component. Moreover, with an open-loop capacitative transducer, should a process diaphragm rupture, the process fluid will then be brought into contact with electrical connections going to the electrode diaphragm, and when the meter is installed in a hazardous area, this may have dangerous consequences.

D In a force-balance differential pressure transmitter of the closed-loop type, one of the more expensive components is the feedback motor. This expense is obviated in an open-loop transmitter in accordance with the invention.

E Despite its simpler and less expensive construction, the accuracy of a force-beam transmitter of the open-loop type is substantially the same as a transmitter of the closed-loop type.

Briefly stated, these objects are attained in an open-loop differential pressure transmitter in which a force beam is pivotally mounted on the housing of the meter body, the lower end of the beam below the fulcrum lying within the body chamber and the upper end of the beam above the fulcrum extending outside of the body. Pressure-responsive diaphragm means are provided to produce an input force that depends on the difference between the low and high pressure fluid inputs, this input force being applied to the lower end of the beam to deflect same to an extent that depends on the flow rate being measured. Operatively coupled to the upper end of the beam and external to the meter body is a motion detector adapted to convert the deflection of the beam to a corresponding electrical signal suitable for transmission.

OUTLINE OF THE DRAWINGS

Figure 4:
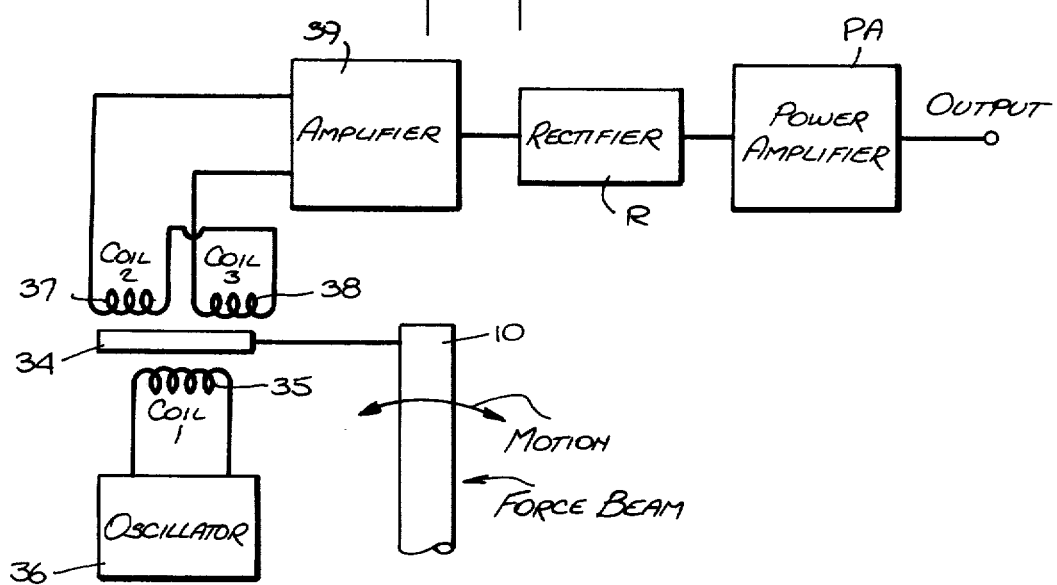

For a better understanding of the invention as well as other objects and further features thereof, reference is made to the following detailed description to be read in conjunction with the accompanying drawings, wherein:

FIG. 1 illustrates an open-loop force-beam differential-pressure transmitter in accordance with the invention;

FIG. 2 schematically shows a first embodiment of a motion detector of the magnetostriction oscillator type;

FIG. 3 schematically shows a second embodiment of a motion detector of the dual magnetostriction oscillator type;

FIG. 4 schematically shows a third embodiment of a motion detector of the differential transformer type;

FIG. 5 schematically shows a fourth embodiment of a motion detector of the variable reluctance type;

FIG. 6 schematically shows a fifth embodiment of a motion detector of the capacitative type;

FIG. 7 is the equivalent circuit of the capacitative detector; and

FIG. 8 schematically shows a sixth embodiment of a motion detector of the strain gauge type.

DESCRIPTION OF INVENTION

Basic Structure of D-P Transmitter

Referring now to FIG. 1, there is schematically illustrated an open-loop force-beam differential-pressure (D-P) transmitter according to the invention. The two major elements of the D-P transmitter are the measuring element that senses the existing differential pressure and converts it into a beam motion, and the motion detection element that converts the motion of the force-beam into an electrical output signal proportional to the differential being measured.

The measuring element is generally defined as that portion of the instrument which is below the fulcrum F of force-beam 10. This beam is pivotally mounted on the housing of a meter body M. The measuring element includes a differential-pressure capsule provided with a pair of identical pressure chambers 11 and 12, wherein corrugated metal diaphragms 11A and 12A are mounted. The diaphragms form the walls of a meter chamber containing a hydraulic fill 13.

Low and high fluidic pressures are applied to pressure chambers 11 and 12, respectively. In practice, suitable pipes carrying fluid under pressure are coupled to the chambers, the pipes being connected to the upstream and downstream sides of an orifice plate inserted in a process line, whereby the differential pressure between the upstream and downstream pipes is proportional to the square of flow rate through the line.

The D-P transmitter may therefore be mounted directly in the line at a point remote from a central control station to which the measurement data is sent in the form of an electrical signal. At the control station, the received signal may be indicated or recorded, or used to operate process-control apparatus.

In the meter chamber, pressure diaphragms 11A and 12B are joined together by means of a link-rod 14 whose midpoint is connected to the lower extremity of force-beam 10. The beam is pivotally supported in the vertical position by a seal diaphragm 15 and by vertical flexures (not shown). Because of the difference between the low and high pressure fluids applied to pressure-responsive diaphragms 11A and 12B, link 14 tends to shift leftward to an extent depending on this difference, thereby applying a force to the lower extremity of beam 10 and causing deflection of the beam in the clockwise direction to a degree proportional to the differential pressure. The purpose of hydraulic fill 13 is to provide hydraulic damping of noise.

The extent of movement at the upper end of the force-beam is a function of the spring rate of the pressure-sensing diaphragms 11A and 12A and the sealing diaphragm 15, as well as the spring rate of a pair of opposing range springs 18 and 19, each connected between a point on the upper end of the force-beam and a fixed ground or frame point. Zero suppression bias is mechanically provided by the range springs, the tension thereof being adjustable.

The degree of beam deflection is determined by a motion detector, generally designated by numeral 20, which produces a proportional electrical signal that is amplified in output amplifier 21 to yield a high-level output signal in the usual process control range (i.e., 4 to 20 mADC).

While it is generally assumed, in a force-balance transmitter, that the force beam is virtually motionless because the input force applied to the bar is balanced by the corresponding feedback force, in reality one will observe a slight motion of the bar in normal operation. This slight motion is approximately 0.005 inches and is linear with respect to differential pressure applied to the instrument. Such slight motion is required, for the detector responds to the motion to generate the necessary feedback signal.

Should the force bar be used in conjunction with a differential-pressure capsule inn an open-loop arrangement, the capsule and the associated force bar would tend to move far beyond the linear region since no feedback force acts to limit force bar displacement. It is for this reason that in an open-loop instrument in accordance with the invention, the force bar movement is severely restrained by range springs. The degree of restraint is such as to limit force bar movement to an extent equivalent to that encountered in a force-balance instrument. Hence despite the absence of a feedback force, as in a closed-loop force-balance transmitter, the open-loop force-beam instrument in accordance with the invention exhibits a high degree of linearity comparable to that of the force-balance transmitter.

But since in this restrained open-loop force-beam arrangement, the response to a differential pressure is in the form of a slight displacement, it is important that the detector associated with the beam be highly sensitive to the movement thereof.

The remaining figures of the drawing illustrate preferred types of highly-sensitive motion detectors in accordance with the invention. It is to be understood that the invention is not limited to the specific differential pressure capsule shown in FIG. 1, and that any existing form of differential pressure meter body adapted to produce an input force to deflect a pivoted force-beam may be used in conjunction with a motion detector in an open-loop arrangement.

First Embodiment of Motion Detector

Referring to FIG. 2, there is shown a magnetostriction-type motion detector which includes a wire 22, one end of which is attached to the top end of deflectable force-beam 10, the other end being anchored on a bracket 23 fixed to the meter body. The wire, which is formed of magnetostrictive material, such as 0.02 inch NI-Span C, has an S-curve bend therein, thereby defining an arcuate section 22A and a reverse arcuate section 22B.

Magnetostriction refers to a change in the dimensions of a ferromagnetic substance in response to a magnetic force. The effect appears most strongly in iron, nickel and cobalt, as well as in alloys of these metals. There are many possible physical changes that a magnetostrictive material may undergo. Thus the change may be in linear or circular dimensions, or in volume. Circular changes in a magnetostrictive wire takes the form of a twisting or torsional motion.

In the magnetostriction motion detector, the primary winding of a detector transformer 24 is connected across section 22A of wire 22 through leads $L_1$ and $L_2$, and the secondary of a driver transformer 25 is connected across section 22B through leads $L_3$ and $L_4$, leads $L_2$ and $L_3$ both being soldered or welded to the junction of the two wire sections (a common lead may be used for leads $L_2$ and $L_3$). Adjacent section 22A is a permanent magnet bar 26, while adjacent section 22B is a like permanent magnet bar 27 so that each section of the wire is exposed to a stationary magnetic field.

When a current pulse is applied through leads $L_3$ and $L_4$ to section 22B, the resultant electric field interacts with the magnetic field established by magnet 27 to impart a torsional motion in this section. This phenomenon is referred to as the Wiedman effect. This twisting action gives rise to a mechanical pulse that is propagated along the wire toward the adjacent section 22A. The mechanical pulse received in section 22A interacts with the magnetic field established therein by bar magnet 26 to induce a voltage pulse in wire section 22A. This phenomenon is known as the reverse Wiedman effect. In practice, this voltage attains a level of a few millivolts.

Thus section 22B acts as a torsional motor that is responsive to an incoming electric pulse to produce a mechanical pulse which travels along the wire into section 22A. Section 22A acts as a generator to convert the incoming mechanical pulse into an electrical pulse.

The secondary winding of transformer 24 is connected to the input of an electronic amplifier 28 whose output is coupled to the primary winding of transformer 25. When the amplifier is first turned on, the initial surge produces a current pulse which is applied to section 22B, and this causes section 22A to generate a pulse which is fed to the input of the amplifier. This in turn results in an amplified output pulse, thereby creating a positive feedback or regenerative path sustaining oscillations.

The frequency of the oscillations produced by the magnetostriction oscillator including amplifier 28 is determined by the delay time of the wire. The reason NI-span C is preferred as the wire material is that it affords a stable delay time despite ambient temperature changes. Transformers 24 and 25 serve only to match the impedances of the wire sections with the amplifier input and output impedances. In practice, the circuit can be designed without such transformers.

The time delay and hence the frequency of the signal generated by the magnetostriction oscillator depends on the radius of curvature of wire sections 22A and 22B. Since one end of wire 22 is attached to the top of force-beam 10 and is caused by the deflection of this beam to move closer to the fixed point established by bracket 23 to which the other end of the wire is attached, thereby changing the radius of curvature, the oscillator frequency is caused to change in proportion to the motion of the beam.

The signal derived from the output of amplifier 28 is applied to a frequency-to-voltage (or current) converter F/V, which produces a voltage (or current) signal proportional to the applied frequency. This signal is amplified by power amplifier PA to provide the desired output in the 4 to 20 mA-DC range.

In the arrangement shown in FIG. 2, in lieu of an S-shaped wire, one may use a C-shaped or a spiral-shaped wire, such that the delay time depends on the radius of curvature, as determined by the motion of the force-beam. Also, in practice, a single magnet may be used rather than a pair of magnets as shown, as long as the single magnet is oriented to subject both arcuate sections of the wire to a magnetic field.

Second Embodiment

In the dual magnetostriction wire oscillator arrangement shown in FIG. 3, deflectable force-beam 10 is coupled to a pair of magnetostriction oscillators A and B whose curved wires 30 and 32 are symmetrically arranged on opposite sides of the beam. Each oscillator is essentially the same as the single oscillator shown in FIG. 2, except that instead of a pair of bar magnets, one for each wire section, each oscillator is provided with a single magnet to establish a magnetic field embracing both arcuate sections.

Oscillator A is constituted by a feedback amplifier 29, which cooperates with the arcuate sections of the S-shaped magnetostrictive wire 30 to produce an output signal $f_1$ whose frequency is increased by a displacement of the beam in the counterclockwise direction. Oscillator B is constituted by a feedback amplifier 31 which cooperates with the arcuate sections of the identical S-shaped magnetostrictive wire 32 to produce an output signal $f_2$, whose frequency is decreased by a displacement of beam 10 in the counterclockwise direction.

Output signals $f_1$ and $f_2$ generated by the pair of oscillators are applied to a mixer 32 from which is derived a low-frequency difference beat signal $f_3$ ($f_3 = f_1 - f_2$) whose frequency is proportional to the extent of force-beam movement. Signal $f_3$ is then converted in a frequency-to-current converter 33 to the desired 4 to 20 mA-DC output.

Since oscillators A and B operate differentially, the sensitivity of the system is twice as high as that of a single oscillator. The reason for this is that a given beam displacement results in equal and opposite deviations in the operating frequencies of oscillators A and B from a central frequency representing the neutral or zero position of the beam. For example, if the frequency of oscillator A deviates from a center frequency of 182,000 Hz to 182,200 Hz and that of oscillator B simultaneously deviates from 182,000 Hz to 181,800 Hz, the resultant beat frequency is 400 Hz, which is twice the 200 Hz deviation of each oscillator.

Moreover, the effect of temperature oscillators A and B will be the same, and cause each oscillator to deviate to the same extent from the central frequency; hence this effect will be balanced out in that the output frequency $f_1$ of oscillator A is subtracted from the output frequency $f_2$ of oscillator B in mixer 32. Thus the symmetrical arrangement of oscillators A and B has the advantage of high sensitivity and temperature stability.

Third Embodiment

In the motion detector shown in FIG. 4, use is made of a transducer in the form of a differential transformer whose armature 34 is mechanically coupled to the top of force-beam 10 and is shifted thereby relative to the windings of the transformer.

The primary winding 35 of the transformer is connected to an oscillator or A-C source 36, and the two secondary windings 37 and 38 are connected in series opposition to the input of an amplifier 39. Thus when armature 34 occupies its neutral position, the A-C voltage induced in both secondary windings are equal and opposite and cancel out, so that no output is yielded by amplifier 39.

But when beam 10 is deflected to shift the position of the armature relative to the stationary windings, then the A-C voltages from the secondary windings are unequal to an extent depending on the degree of shift to produce an amplified A-C output in amplifier 39 which is rectified by rectifier R. Thw D-C output of rectifier R is amplified in power amplifier PA to yield the desired 4 to 20 mA-DC signal representing differential pressure. The advantage of this arrangement is that it makes it possible to use low-cost, commercially-available, differential transformers. However, such motion detectors have a lower temperature stability than the magnetostriction type of the first and second embodiments.

Fourth Embodiment

In the variable reluctance motion detector shown in FIG. 5, a coil 40 is wound about the center leg of a pot-shaped core 41 having, in section, an E-configuration. A ferrite slug 42 mechanically linked to the top end of force-beam 10 is movable relative to the open end of the core, therby varying the inductance of coil 40 as a function of the beam displacement.

Coil 40 is interposed between a stable oscillator 42 and an amplifier 43 and it functions as a variable impedance to change the amplitude of the oscillator signal applied to the input of the amplifier in proportion to differential pressure. The A-C output of amplifier 43 is rectified by rectifier 44 to produce a D-C signal, which is amplified in power amplifier PA to provide the desired output signal in the 4 to 20 mA-DC range.

Fifth Embodiment

The motion detector shown in FIGS. 6 and 7 is of the capacitative type and includes an electrode 46 which is mechanically linked to the top end of force-beam 10 and is laterally movable with respect to a pair of stationary electrodes 47 and 48. Thus a shift of the movable electrode 46 to the left results in an increase in the value of the capacitance $C_1$ established between this electrode and electrode 48 and a corresponding decrease in the value of capacitance $C_2$ established with respect to electrode 47. Conversely, a shift of movable electrode 46 toward the right gives rise to a decrease in capacitance $C_1$ and a corresponding increase in capacitance $C_2$.

Variable capacitors $C_1$ and $C_2$ of the motion detector form two arms of a capacitance bridge whose remaining arms are formed by fixed capacitors $C_3$ and $C_4$. An A-C excitation signal derived from an oscillator 49 is applied to the input diagonals of the bridge. The arrangement is such that when force-beam 10 occupies its neutral position, the values of capacitors $C_1$ and $C_2$ then match those of fixed capacitors $C_3$ and $C_4$, so that the bridge is in balance and no voltage is yielded at the output diagonals which are connected to a detection amplifier 50.

But when the values of capacitors $C_1$ and $C_2$ change differentially because of the motion of force-beam 10, the resultant imbalance of the bridge produces an output voltage that is proportional to the degree of beam motion and hence to differential pressure. The bridge output is amplified by bridge amplifier 50 and applied to a power amplifier 51 to produce the desired 4 to 20 mA-DC output.

In practice, one of the stationary electrodes 47 or 48 may be eliminated to provide a single variable capacitor for the bridge, the excluded variable capacitor being replaced by a fixed capacitor. But while this is a somewhat less expensive arrangement, it results in a decrease in the sensitivity of the motion detector and a loss in linearity.

Sixth Embodiment

In the motion detector illustrated in FIG. 8, a range unit is provided with a strain gauge sensing element. This unit, generally designated by numeral 52, is mounted directly above the meter body M.

The unit includes a pair of disc-shaped plates 53 and 54, spaced one above the other, the plates being interconnected by a pair of vertically-extending flat strips 55 and 56 which act as range springs. The top of force beam 10 which extends upwardly from the meter body is received within a central indentation formed in the underside of upper plate 53 and is welded thereto so that upper plate 53 is deflected from its neutral position by the deflectable beam 10 as a function of differential pressure.

Lower plate 54 is secured to the meter body M and is provided with an opening through which beam 10 projects, the diameter of the opening being sufficient to permit free deflection of the beam. This opening is sealed by a flexible diaphragm 15 whose upper end is bonded to the surface of the beam and whose base is bonded to lower plate 54.

Strips 55 and 56 lie within a vertical plane that passes through the central axis of the unit, the strips being disposed at diametrically opposed positions with respect to the beam. The range of the unit may be adjusted by grinding or otherwise physically modifying the thickness or width of the strips which function as range springs. These flat strips behave in a manner comparable to the helical range springs shown in FIG. 1.

Mounted on strip 56 is a strain gauge 58. When, therefore, the force beam is deflected by an input force representing differential pressure, the range springs associated with this unit are similarly deflected and a strain is imposed on gauge 58 which is proportional to the differential pressure. By connecting the gauge, which may be of the resistance, piezoelectric, or any other known type, into an appropriate circuit, one is able to generate a voltage or current proportional to the differential pressure. Alternatively a second gauge may be mounted on the other strip 55, and the two gauges arranged in a bridge circuit analogous to the capacitative bridge shown in FIG. 6.

In practice, the strain gauge need not be mounted on a range spring, but may be mounted on the sealing diaphragm or it may be mounted on a resilient member extending between the top of the force-beam and a mechanical ground to detect and convert the force beam motion into an electronic signal which is amplified to generate a 4 to 20 mA-DC output.

While there have been shown and described preferred embodiments of an open-loop differential-pressure transmitter in accordance with the invention, it will be appreciated that many changes and modifications may be made therein without, however, departing from the essential spirit thereof.

I claim:

1. An open-loop force-beam differential pressure transmitter for producing an electrical signal representing differential pressure, said transmitter comprising:

A a measuring element including a meter body having a chamber, a force-beam mounted on a fulcrum, the lower portion of the beam below the fulcrum extending into said chamber and the upper portion thereof above the fulcrum extending outside the meter body, diaphragm means in said meter body responsive to the difference in pressure between high and low pressure inputs to produce an input force, and means to apply said force to the lower end of the beam to cause deflection of said beam about said fulcrum to a degree depending on the pressure difference, B at least one range spring, one end of said spring being attached to a point on the upper portion of said beam and the other end to a fixed point, said spring restraining the movement of said beam to an extent whereby the movement of the beam in the measuring range of the instrument, though it exceeds about 0.001 inches, is slight and is substantially linear with respect to the applied input force, and C a beam motion detection element coupled to the upper end of said beam and including means responsive to said slight beam motion to convert said motion into a corresponding electrical signal.

2. A transmitter as set forth in claim 1, including a pair of range springs symmetrically arranged with respect to said beam and fixed points.

3. A transmitter as set forth in claim 1, wherein said motion detection element includes a curved magnetostrictive wire, one end of which is attached to said upper end of said beam and the other end of which is attached to a fixed point whereby deflection of said beam changes the radius of curvature of said wire, and means responsive to the change in radius to produce a signal that depends thereon.

4. A transmitter as set forth in claim 3, wherein said means responsive to the change in radius includes a permanent magnet subjecting said wire to a magnetic field, an amplifier whose output is connected to one section of the wire to apply electrical pulses thereto producing torsional motions that section propagated in the wire and received by an adjacent sectionn thereof to induce electrical pulses therein which are applied to the input of the amplifier to sustain oscillations in said amplifier whose frequency depends on said radius of curvature, and means to convert said oscillations to a D-C signal that varies as a function of the frequency of said oscillations.

5. A transmitter as set forth in claim 4, wherein said wire has an S-bend thereon, one curve of which forms said one section and the reverse curve of which forms said adjacent section.

6. A transmitter as set forth in claim 3, including a pair of said curved wires symmetrically arranged with respect to said beam, each wire being attached at one end to said beam and at the other end to a fixed point, whereby said wires undergo opposing changes in radius in response to the deflection of said beam, each wire being associated with a permanent magnet and a respective amplifier whereby the amplifiers produce oscillations whose frequencies depend on the radius of curvature of the wires associated therewith, a mixer coupled to the outputs of said amplifiers to produce a beat signal representing the difference in the frequencies thereof, and means to convert said beat frequency into a D-C signal.

7. A transmitter as set forth in claim 1, wherein said motion detection element is constituted by a differential transformer whose armature is mechanically linked to the upper portion of said beam to produce a signal which depends on the motion of said beam.

8. A transmitter as set forth in claim 7, wherein said transformer has a primary coupled to an A-C source and a pair of secondaries connected in series opposition, the output of said secondaries being amplified and rectified to produce said D-C signal.

9. A transmitter as set forth in claim 1, wherein said motion detection element is constituted by a variable reluctance device having at least one coil wound about a core and an armature movable with respect to said core and mechanically linked to said beam to vary the inductance of the coil as a function of beam movement.

10. A transmitter as set forth in claim 9, wherein said coil is interposed between a source of alternating voltage and an amplifier and acts as a variable impedance to vary the amplitude of alternating voltage applied to said amplifier, and means to rectify the output of said amplifier to produce said signal.

11. A transmitter as set forth in claim 1, wherein said motion detection element is constituted by a variable capacitor whose movable electrode is mechanically linked to said beam to provide a capacitance whose value depends on the extent of beam motion, and means to convert said change in capacitance to a corresponding electrical signal.

12. A transmitter as set forth in claim 1, wherein said motion detection element includes a strain gauge, and means coupled to said beam to subject said gauge to strain as a function of beam deflection.

13. A transmitter as set forth in claim 12, wherein said gauge is mounted on the fulcrum of the beam.

14. A transmitter as set forth in claim 13, wherein said means coupled to said beam is a range spring extending between a top plate secured to the top of said beam and a bottom plate secured to the meter body.

15. A transmitter as set forth in claim 14, further including a second range spring extending between said plates at a position diametrically opposed to the first spring, the upper portion of the beam extending through the central opening in the bottom plate.

16. A transmitter as set forth in claim 1, wherein the movement of the beam is restrained to prevent motion of the beam beyond about 0.005 inches in said measuring range.

* * * * *